(12) United States Patent
Lim

(10) Patent No.: US 8,687,853 B2
(45) Date of Patent: Apr. 1, 2014

(54) METHOD, SYSTEM AND COMPUTER-READABLE RECORDING MEDIUM FOR PROVIDING SERVICE USING ELECTRONIC MAP

(75) Inventor: Seung Phill Lim, Yongin-si (KR)

(73) Assignee: NHN Corporation, Gyeonggi-do (KR)

( * ) Notice: Subject to any disclaimer, the term of this patent is extended or adjusted under 35 U.S.C. 154(b) by 677 days.

(21) Appl. No.: 12/618,382

(22) Filed: Nov. 13, 2009

(65) Prior Publication Data
US 2010/0119121 A1    May 13, 2010

(30) Foreign Application Priority Data

Nov. 13, 2008  (KR) .......................... 10-2008-0112995

(51) Int. Cl.
*G06K 9/00* (2006.01)
(52) U.S. Cl.
USPC .......................................................... 382/113
(58) Field of Classification Search
USPC ................................................. 382/103, 113
See application file for complete search history.

(56) References Cited

U.S. PATENT DOCUMENTS

| 5,642,434 | A | 6/1997 | Nakao |
| 5,995,663 | A | 11/1999 | Itsuzaki |
| 6,487,305 | B2 * | 11/2002 | Kambe et al. ................. 382/113 |
| 8,180,103 | B2 * | 5/2012 | Kitaura et al. ................ 382/103 |
| 2008/0143727 | A1 | 6/2008 | Oh |

FOREIGN PATENT DOCUMENTS

| JP | 2000-261783 | 9/2000 |
| JP | 2005-286747 | 10/2005 |
| JP | 2006-119797 | 5/2006 |
| JP | 2006-277196 | 10/2006 |
| JP | 2007-017803 | 1/2007 |

* cited by examiner

*Primary Examiner* — Tom Y Lu
(74) *Attorney, Agent, or Firm* — Harness, Dickey & Pierce

(57) ABSTRACT

The present disclosure relates to a method, system and computer-readable recording medium for providing an electronic map-based service. According to an aspect of the disclosure, a method of recognizing a shape included in image data associated with an electronic map includes: acquiring region information corresponding to first image data; determining a candidate region on the electronic map using the region information; determining at least one candidate image using the candidate region; and recognizing a shape included in the first image data using the candidate image.

12 Claims, 4 Drawing Sheets

| Image data Identification Information | Path | Region Information | Tag Information |
|---|---|---|---|
| (a) | ....... | (100, 200) | 63-Building |
| (b) | ....... | (100, 200) | Won-hyo Bridge |
| (c) | ....... | (210, 300)<br>(220, 320) | River Tower |
| ⋮ | ⋮ | ⋮ | ⋮ |

METHOD, SYSTEM AND COMPUTER-READABLE RECORDING MEDIUM FOR PROVIDING SERVICE USING ELECTRONIC MAP

CROSS REFERENCE TO RELATED APPLICATION

This application claims priority from and the benefit of Korean Patent Application No. 10-2008-0112995, filed on Nov. 13, 2008, which is hereby incorporated by reference for all purposes as if fully set forth herein.

BACKGROUND OF THE INVENTION

1. Field of the Invention

The present disclosure relates to a method, system and computer-readable recording medium for providing an electronic map-based service. More particularly, the present disclosure relates to a method, system and computer-readable recording medium that can store a particular place on an electronic map in association with image data corresponding to the is particular place on the electronic map, and link a particular region or pixel on the stored image data with other image data to provide the other image data when a user clicks the particular region of the image data while searching for the image data.

2. Discussion of the Background

With recent increase in use of the Internet and distribution of global positioning system (GPS) receivers, geographical information such as maps and the like is supplied to a user generally in the form of digital data that replaces traditional printed matter such as books or the like. Digital geographical information is generally supplied through an electronic map service via the Internet, a navigation system equipped to vehicles, and the like. Advantageously, the digital geographical information is often coupled to a user interface module having a retrieval function to provide various conveniences to a user. Further, when there is a need to change the geographical information, it can be easily updated through remote operation or the like, so that the digital geographical information is preferable to conventional printed matter because it can be easily kept current and up-to-date.

Conventionally, however, service providers for digital geographical information provide electronic map screens coupled to retrieval interfaces and operated to display a simple combination of marks. Since information displayed on the electronic map screens is remarkably different from an actual image of a place corresponding to the information, it is difficult to confirm the actual image of the corresponding place based on the information.

Therefore, in an attempt to solve such a problem, US Patent Application Publication No. 2008-0143727, filed on Nov. 8, 2007 and published on Jun. 19, 2008, discloses a technique for an electronic map service, which allows panoramic image data corresponding to a particular place on an electronic map to be provided to a user, while allowing different panoramic image data corresponding to a place displayed on a certain region of the panoramic image data to be provided to the user when the user clicks the certain region of the panoramic image data. Accordingly, the user can confirm an actual image of the particular place on the electronic map based on the panoramic image data, and can search for different panoramic data image showing, in more detail, the particular place on the panoramic data image, which is being searched by the user, via a link between these panoramic data.

However, the publication merely discloses a technique that permits the link between the panoramic image data to be manually generated by a user or a provider of the panoramic image data. Thus, the technique has a problem in that difficulty in management of the link information becomes severe as the image data is accumulated by the geographical information service.

BRIEF SUMMARY

Exemplary embodiments of the present invention provide solutions for the problems described above.

Exemplary embodiments of the present invention also provide a way to allow a user to confirm an actual image of a selected place based on information of the selected place displayed on an electronic map by linking an electronic map service to image data.

Exemplary embodiments of the present invention also provide a way to allow a user to directly access other image data through a link included in image data associated with a particular place on an electronic map.

Exemplary embodiments of the present invention also provide a way to allow link information between a plurality of image data associated with an electronic map to be automatically generated in an effective manner.

Additional features of the invention will be set forth in the description which follows, and in part will be apparent from the description, or may be learned by practice of the invention.

An exemplary embodiment of the present invention discloses a method of recognizing a shape included in image data associated with an electronic map, including acquiring region information corresponding to first image data on the electronic map, determining a candidate region on the electronic map using the region information, determining at least one candidate image using the candidate region, and recognizing a shape included in the first image data using the at least one candidate image.

An exemplary embodiment of the present invention also discloses a method of generating an association relation between image data associated with an electronic map, including acquiring region information corresponding to first image data associated with the electronic map, determining a candidate region on the electronic map using the region information, acquiring at least one piece of shape identification information using the candidate region on the electronic map, determining second image data using the at least one piece of shape identification information, and generating an association relation between the first image data and the second image data.

An exemplary embodiment of the present invention also discloses a method of providing image data to a terminal unit, the method including storing second image data in association with a particular region on first image data, the second image data being acquired using a particular region on the electronic map corresponding to the first image data and direction information of the first image data, further including providing the first image data to a terminal unit, and further including providing the second image data to the terminal unit if the particular region on the first image data is selected through the terminal unit.

An exemplary embodiment of the present invention also discloses a system for recognizing a shape included in image data associated with an electronic map, including a candidate shape filtering part that acquires region information corresponding to first image data on the electronic map, determines a candidate region on the electronic map using the region information, and determines at least one candidate image using the candidate region, and further including a shape recognition part that recognizes a shape included in the first image data using the at least one candidate image.

An exemplary embodiment of the present invention also discloses a system for generating an association relation between image data associated with an electronic map, including a candidate shape filtering part that acquires region information corresponding to first image data on the electronic map, determines a candidate region on the electronic map using the region information, and acquires at least one piece of shape identification information using the candidate region, further including a shape recognition part that determines second image data using the at least one piece of shape identification information, and further including an image association part that generates an association relation between the first image data and the second image data.

An exemplary embodiment of the present invention also discloses a system for providing image data to a terminal unit, including an image link generation module that acquires second image data using a particular region on an electronic map corresponding to first image data and direction information of the first image data and stores the second image data in association with a particular region on the first image data, and further including a user interface is module that provides the first image data to the terminal unit and provides the second image data to the terminal unit if the particular region on the first image data is selected through the terminal unit.

An exemplary embodiment of the present invention also discloses a non-transitory computer-readable medium including an executable program which, when executed, performs the steps of acquiring region information corresponding to first image data on the electronic map, determining a candidate region on the electronic map using the region information, determining at least one candidate image using the candidate region, and recognizing a shape included in the first image data using the at least one candidate image.

An exemplary embodiment of the present invention also discloses a non-transitory computer-readable medium including an executable program which, when executed, performs the steps of acquiring region information corresponding to first image data associated with the electronic map, determining a candidate region on the electronic map using the region information, acquiring at least one piece of shape identification information using the candidate region on the electronic map, determining second image data using the at least one piece of shape identification information, and generating an association relation between the first image data and the second image data.

An exemplary embodiment of the present invention also discloses a non-transitory computer-readable medium including an executable program which, when executed, performs the steps of storing second image data in association with a particular region on first image data, the second image data being acquired using a particular region on the electronic map corresponding to the first image data and direction information of the first image data, providing the first image data to a terminal unit, and providing the second image data to the terminal unit if is the particular region on the first image data is selected through the terminal unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figures 1, 2:
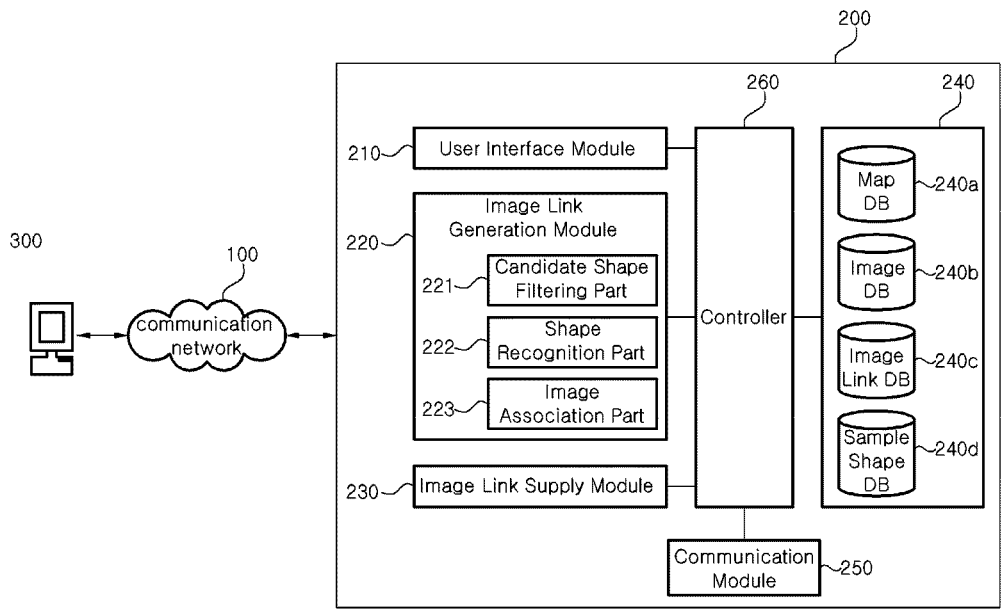
FIG. 1 is a block diagram of an overall system for providing an electronic map service in accordance with an exemplary embodiment of the present disclosure.
FIG. 2 is a table showing examples of data stored in an image database assembled by the system in accordance with an exemplary embodiment of the present invention.

The invention is described more fully hereinafter with reference to the accompanying drawings, in which exemplary embodiments of the invention are shown. This invention may, however, be embodied in many different forms and should not be construed as is limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Exemplary embodiments of the present invention will now be described in detail with reference to the accompanying drawings. The following exemplary embodiments are given by way of illustration to provide a thorough understanding of the invention to those skilled in the art. Hence, it should be understood that the exemplary embodiments of the present invention are different from each other but are not exclusive with respect to each other. For example, certain shapes, configurations and features disclosed herein may be realized by other embodiments without departing from the spirit and scope of the invention. Further, it should be understood that positions and arrangement of individual components in each of the exemplary embodiments may be changed without departing from the spirit and scope of the invention. Therefore, the following detailed description should not be construed to limit the claims to the specific exemplary embodiments, but should be construed to include all possible embodiments along with the full scope of equivalents to which such claims are entitled.

Hereinafter, exemplary embodiments of the present invention will be described in detail with reference to the accompanying drawings to allow a person having ordinary knowledge in the art to easily implement the present disclosure.

Configuration of Overall System

FIG. 1 is a block diagram of an overall system for providing an electronic map service in accordance with an exemplary embodiment of the present invention.

Referring to FIG. 1, the system according to an exemplary embodiment may is include a communication network 100, a map service system 200 for providing an electronic map service, and a user terminal unit 300.

The communication network 100 may be constructed in any form, such as local area network (LAN), metropolitan area network (MAN), wide area network (WAN), and the like, so as to realize wired or wireless communication without being limited to a particular mode. In an exemplary embodiment, the communication network 100 may refer to the World Wide Web (WWW).

According to an exemplary embodiment, the map service system 200 may provide map data including geographic information to the user terminal unit 300.

Further, the map service system 200 may associate a point or region on the map data with image data and provide the image data associated with the point or region to the user terminal unit 300 when the point or region on the map data is selected from the user terminal unit 300.

Further, the map service system 200 may generate association relations among a plurality of image data and provide other image data, associated with a certain region or pixel on image data retrieved by a user, to the user terminal unit 300, when the certain region or pixel on the image data is selected through the user terminal unit 300.

According to an exemplary embodiment, the user terminal unit 300 is a digital device that allows a user to access and communicate with the map service system 200. Any digital device such as a personal computer (for example, a desktop computer, notebook computer, and the like), a work station, a personal digital assistant (PDAs), a tablet PC, a mobile phone, and the like may be used as the user terminal unit 300 so long as such device includes a memory and a microprocessor for operation capability.

Next, main components and functions of the respective components of the map service system 200 will be described.

Referring to FIG. 1, the map service system 200 according to an exemplary embodiment of the present invention may include a user interface module 210, an image link generation module 220, an image link supply module 230, a database management module 240, a communication module 250, and a controller 260. The image link generation module 220 may include a candidate shape filtering part 221, a shape recognition part 222, and an image association part 223. According to an exemplary embodiment, at least one of the user interface module 210, image link generation module 220, image link supply module 230, database management module 240, communication module 250, and controller 260 may be program modules that communicate with the user terminal unit 300. The program modules may be included in the map service system 200 in the form of operating systems, application program modules, and other program modules, and may be physically stored in several well known storages. Further, the program modules may be stored in a remote storage that can communicate with the map service system 200. The program modules may include, but are not limited to, routines, subroutines, programs, objects, components, and data structures, which perform particular operations or particular abstract data patterns as described below.

The user interface module 210 according to an exemplary embodiment provides an interface, which allows the user terminal unit 300 to browse map data. More specifically, the user interface module 210 may include a search function, which allows a user to search for a particular region on a map by inputting a search keyword, a display screen control function, which allows a user to enlarge, reduce and move a map screen image, and the like.

Further, according to an exemplary embodiment, the user interface module 210 is may receive image data from the user terminal unit 300 and store the received image in association with a particular region on the electronic map. For example, the user interface module 210 may provide an interface that allows a user to designate or select the particular region on the map and then upload image data associated with the particular region from the user terminal unit 300, and may store the uploaded image data in association with the particular region in an image database 240b described below.

Further, according to an exemplary embodiment, when there is image data associated with a certain region on the electronic map that is being searched by a user, the user interface module 210 may provide information about the image data to the user terminal unit 300 in the form of icons or items, and allow the image data to be provided to the user terminal unit 300 when the user selects any of the icons or items.

Further, according to an exemplary embodiment, when there is other image data associated with image data that is being searched by a user, the user interface module 210 may provide information about the other image data to the user terminal unit 300 in the form of icons or items, and allow the selected other image data to be provided to the user terminal unit 300 when the user selects any of the icons or items.

Next, according to an exemplary embodiment, the image link generation module 220 may generate a link between image data by analyzing the image data stored in the image database 240b.

Specifically, according to an exemplary embodiment, for particular image data stored in the image database 240b, the candidate shape filtering part 221 may acquire information associated with the particular image data, such as corresponding region information, azimuth information or the like. The candidate shape filtering part 221 may also acquire identification information for the particular image data, such as a high building or place, which has a high possibility of being involved in the particular image data, with reference to the information associated with the particular image data an electronic map.

Further, according to an exemplary embodiment, the shape recognition part 222 calculates a degree of similarity by comparing the shape included in the particular image data with candidate image data determined by the candidate shape filtering part 221 to correspond to the identification information, such as geographical features or objects, in order to recognize the shape in the particular image data based on the calculated degree of similarity.

The image association part 223 according to an exemplary embodiment may acquire information about a region on the electronic map where the shape recognized by the shape recognition part 222 is located. Then, when there is different image data stored in association with the region where the shape is located on the map, the image association part 223 may generate link information between the different image data and a portion (for example, at least one pixel) of the particular image data where the shape is detected, and may store the generated link information in an image link database 240c described below.

According to an exemplary embodiment, in response to a request from the user terminal unit 300 searching for image data stored in the image database 240b, the image link supply module 230 may search for other image data that is associated with the image data from the image link database 240c. The image link supply module may also provide link information, which can be linked to the other image data, to the user interface module 210, if the other image data is retrieved.

The database management module 240 according to an exemplary embodiment may include a map database 240a, which stores map data, the image database 240b, which stores is image data associated with regions on the electronic map, the image link database 240c, which stores information about association relations among the image data stored in the image database 240*b*, and a sample-shape database 240*d*, which stores information relating to sample shapes used in a shape recognition process.

The communication module 250 according to an exemplary embodiment enables communication between the map service system 200 and external devices such as the user terminal unit 300 and the like.

According to an exemplary embodiment, the controller 260 controls a data flow among the user interface module 210, the image link generation module 220, the image link supply module 230, the database management module 240, and the communication module 250. In other words, the controller 260 controls the data flow from the exterior or between the respective components of the map service system 200 to allow the user interface module 210, the image link generation module 220, the image link supply module 230, the database management module 240 and the communication module 250 to perform inherent functions thereof.

In the above description, the database, which stores information for realizing the embodiments of the present disclosure, includes four types of databases, that is, the map database 240*a*, the image database 240*b*, the image link database 240*c*, and the sample-shape database 240*d*. However, it should be noted that the structure of the database including this classification can be varied as needed.

Moreover, it should be understood that the term "database" is used herein as the concept including not only a narrow sense of database, but also a broad sense of database including data records and the like based on computer file systems, and that even a collection of simple processing results may also be included in the database according to the exemplary is embodiments of the invention so long as certain data can be extracted from the collection by searching for the data from the collection.

Association of Map Data with Image Data

According to an exemplary embodiment, a particular region on an electronic map provided by the map service system 200 may be associated with image data stored in the image database 240*b*. For example, if a building A is displayed on the electronic map, an identification mark indicating the building A on the electronic map may be associated with an image of the building A. Examples of the identification mark indicating the building A include, but are not limited to, coordinates of the building A on the electronic map, various symbols and text relating to the building A, and the like. Accordingly, when a user clicks or otherwise selects a region on the electronic map on which the building A is located, or an icon associated therewith, an image including the building A may be provided to the user terminal unit 300.

Image data to be stored in the image database 240*b* may be generated or stored by an administrator or user of the map service system 200. In the latter case, the user may upload image data related to a particular geographical feature or object to the map service system 200 after selecting or designating the particular geographical feature or object on the map, so that the uploaded image data can be stored in association with region information on the map in the image database 240*b*.

According to an exemplary embodiment, the region information associated with the image data may be acquired by the map service system 200 and expressed by the coordinates on the electronic map or by a polygonal or circular shape created using two or more coordinates.

Further, according to an exemplary embodiment, the image data may be stored in association with tag information as well as the region information. Here, the tag information is information that indicates an attribute of the image data and may include names of buildings or geographical designations displayed on the image data. Accordingly, even for images stored in association with the same region on the map, the images may be associated with different tag information according to objects displayed on the respective images. The tag information may be directly input by an administrator or a user of the map service system 200 or may be automatically imparted using a text or mark that is present in a region associated with the corresponding image data on the electronic map.

The tag information may be used later to recognize a shape appearing on image data in the process of generating a link between image data. A detailed description of the use of the tag information will be stated below.

Further, according to an exemplary embodiment, if image data is generated using photographic devices such as cameras, the image data may be stored in association with azimuth information. The azimuth information may include information relating to a direction in which the image data is captured. For example, assuming that the azimuth is set to 0 degrees when image data is captured in the north direction, the east, the south, and the west may be expressed by 90, 180, and 270 degrees, respectively. The azimuth information may be directly input by an administrator or user of the map service system 200 or may be obtained by generating the image data using a digital photograph device that is provided with a function for calculating orientation information.

In the case where a panoramic picture is taken, the azimuth information may be provided to a respective pixel column of the panoramic picture. More specifically, after counting the total number of pixel columns constituting the panoramic picture and obtaining a unit pixel-column angle by dividing 360 by the total number of pixel columns, the azimuth of the current pixel column may be calculated by adding an azimuth corresponding to the unit pixel-column angle to an azimuth of a previous pixel column for each time that one pixel column increases from the previous pixel column in the clockwise direction with reference to the north direction (0 degrees).

Then, the azimuth information may be used later to recognize the shape appearing on the image data in the process of generating the link between the image data. A detailed description of the use of the azimuth information will be stated below.

FIG. 2 is a table showing examples of data stored in the image database 240*b*, assembled as described above.

Referring to FIG. 2, the image database 240*b* includes image data identification information, path information for acquiring image data, region information on an electronic map associated with image data, and tag information.

More specifically, referring to FIG. 2, it can be seen that both (a) and (b) are image data associated with the same region on the electronic map, but are provided with different tag information, such as "63 Building" and "Won hyo Bridge," according to objects displayed on the respective image data. Additionally, data (c) include two coordinates as region information. In this case, it can be understood that the image data is associated with a rectangular region created by the two coordinates.

Herein, the term "image data" will be used to indicate an image associated with coordinates or a particular region on an electronic map unless otherwise specified. However, it should be noted that this term is used to aid in understanding of the invention and should not be interpreted to limit the invention.

Generation of Link Information Between Image Data

According to an exemplary embodiment, the shape recognition part 222 of the image link generation module 220 may recognize a shape appearing on image data stored in the image database 240b by analyzing the image data.

As a technique for recognizing a shape included in an image, it is possible to refer to an invention disclosed in Korean Patent Application No. 1995-566 (Korea Patent Laid-open Publication No. 1995-23966 published on Aug. 18, 1995), entitled "shape detecting device" and filed on Jan. 14, 1995 claiming priority to Japanese Patent Application No. 1994-3333 of Matsushita Electric Industrial Co., Ltd. (Korean Patent Application No. 1995-566, and U.S. Pat. No. 5,995,663, issued on Nov. 30, 1999, which corresponds to Korean Patent Application No. 1995-566, should each be considered to be incorporated herein by reference in its entirety). According to this technique, the shape detecting device outputs image information of an object after photographing the object, digitizes the output image information to store the digitized image information as image data, determines an approximate position of the corresponding image, and detects edge points of the image based on the degree of shading of the image to deduce a borderline of the image. Further, it is possible to refer to an invention disclosed in Korean Patent Application No. 1994-16927 (Korea Patent Laid-open Publication No. 1995-5034 published on Feb. 18, 1995), entitled "shape detecting method" and filed on Jul. 14, 1994 claiming priority to Japanese Patent Application Nos. 1993-174134 and 1993-194355 of Matsushita Electric Industrial Co., Ltd. (Korean Patent Application No. 1994-16927, and U.S. Pat. No. 5,642,434, issued on Jun. 24, 1997, which corresponds to Korean Patent Application No. 1994-16927, should each be considered to be incorporated herein by reference in its entirety). According to this method, even in the case where there is a region on an image where the degree of shading remarkably changes excluding a detection target, the image is divided into a number of unit pixels to calculate a correlation value of partial shades, thereby achieving accurate detection of the target in the image.

According to an exemplary embodiment, the above and other techniques for recognizing shapes may be applied to recognition of buildings and objects included in image data and to extraction of information thereabout.

According to an exemplary embodiment, the sample-shape database 240d may store sample shape images in association with identification information about shapes appearing on the corresponding images, and the shape recognition part 222 may recognize the shapes by comparing shapes detected from image data with the sample-shape data stored in the sample-shape database 240d.

Alternatively or additionally, image data stored in the image database 240b may be used for comparison since the image data may be associated with tag information in the image database 240b and the tag information can be recognized as identification information of a certain shape.

Here, since image matching with respect to all of the sample-shape data stored in the sample-shape database 240d for recognition of a certain shape can impart a considerable operation burden on the map service system 200, the image matching may be performed to a suitable range of the sample shape images.

More specifically, according to an exemplary embodiment, the candidate shape filtering part 221 may determine a sample shape image as an image matching target with reference to the electronic map and the region information, tag information and azimuth information stored in the image database 240b.

In other words, the candidate shape filtering part 221 may acquire a candidate region on the electronic map, which can be determined as being included in corresponding image data, using the region information and the azimuth information of the image data. For example, among regions included within a radius from certain coordinates included in the region information on the electronic map, a region included in an angle with reference to the azimuth of the image data may be acquired as the candidate region. Also, if the image data is a panoramic image, it is possible to refer to azimuth information of pixel columns of the image in recognition of the respective shapes in the image.

Figure 3:
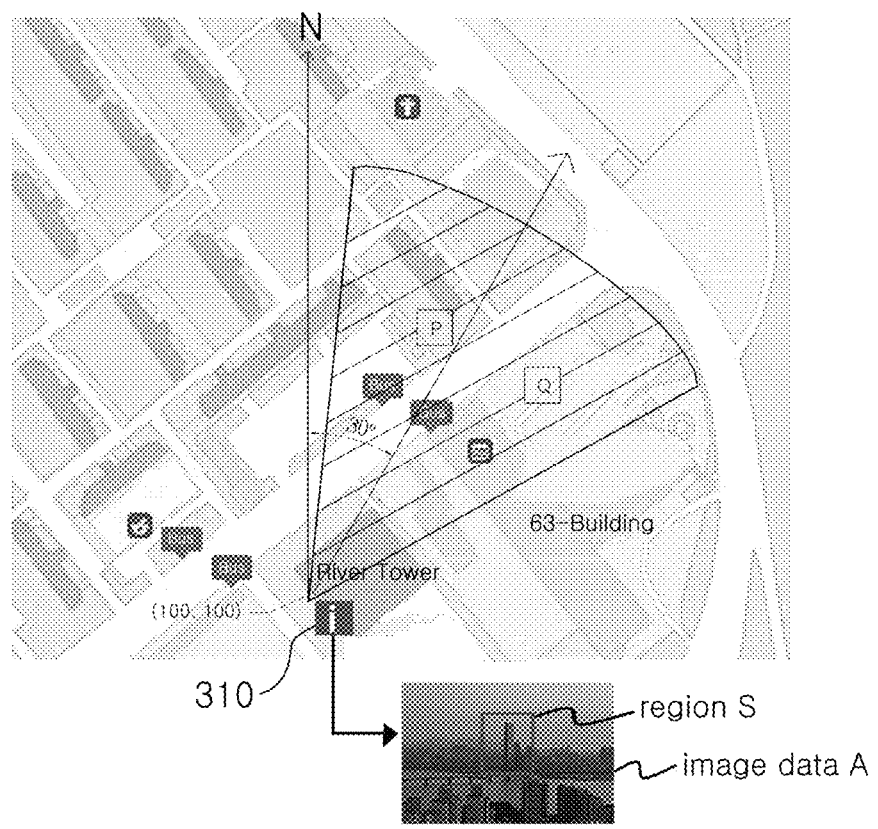
FIG. 3 is a view of a candidate region determined with reference to region information and azimuth information of image data.

FIG. 3 illustrates one example of a candidate region determined with reference to region information and azimuth information of image data.

In FIG. 3, it is assumed that image data A used in determination of the candidate region is captured in a direction of an azimuth angle of 30 degrees with reference to the north from coordinates (100, 100), and, the image data A may be provided to the user terminal unit 300 when a user clicks a certain icon 310 located near the coordinates.

Further, referring to FIG. 3, it can be confirmed that the shaded candidate region shown fanwise with reference to the coordinates and the azimuth on the electronic map. The range of the candidate region may be changed by adjusting a radius centered on the coordinates and a central angle centered on the azimuth. Here, as described above, it should be understood that the candidate region need not have a circular (or fanwise) shape, but may have any of various polygonal shapes.

Although FIG. 3 does not show the case where the image data is a panoramic image, the determination of the candidate region may be performed in the same manner as above using the azimuth information of pixel columns on which an identification target is placed.

Next, the candidate shape filtering part 221 according to an exemplary embodiment may acquire identification information such as geographical features or objects included in the candidate region on the electronic map. The shape recognition part 222 may perform image matching between sample shape images and shape identification information, where the shape identification information constitutes the acquired identification information. The shape recognition part 222 may also or alternatively perform image matching between image data and tag information, where the tag information constitutes the acquired identification information.

Referring again to FIG. 3, since the shaded candidate region includes buildings P and Q, the shape recognition part 222 performs image matching between shapes appearing on image data A and sample shapes having shape identification information referred to as P or Q among sample shapes included in the sample shape database 240d.

When a certain shape included in the image data is recognized by the process as described above, the image association part 223 according to an exemplary embodiment may generate link information between the image data and other image data associated with a region on the electronic map where a geographic feature or object is placed, which is calculated to have a critical value or more of similarity with respect to the certain shape.

Referring to FIG. 3, if it is determined that a degree of similarity between the building P present within the candidate region and a particular shape appearing on the image data A is high, the image association part 223 determines whether there is image data associated with a region on the electronic map where the building P is located. If image data B is associated with the region on the electronic map where the building P is located, the image association part 223 may generate link information between the image data B and the region occupied by the shape detected in the image data A, and store the link information in the image link database 240c.

More specifically, assuming that S indicates the region where the shape of the building P is located in the image data A, the image association part 223 generates and stores link information such as [A, S, B] between the image data A and the image data B in the image link database 240c.

As another method for generating link information between image data, it is possible to refer to the tag information of the image database 240b. For example, if a shape P is recognized near a region S in image data A, the image association part 223 searches for image data including the shape P as tag information from the image database 240b. As a result, if image data B is retrieved by the image association part 223, link information such as [A, S, B] may be generated and stored in the image link database 240c.

According to another exemplary embodiment, the link information generated as above may further include keyword information representing an attribute of the recognized shape. For example, if the shape included in the region S of the image data A is recognized as "63 Building" during the shape recognition process described above, link information such as [A, S, B, 63 Building] may be generated. The keyword information included in the link information may be acquired using the shape recognition information of the sample shape database 240d or the tag information of the image database 240b. According to an exemplary embodiment, the keyword information included in the link information may be used to acquire a map region or image data corresponding to a search keyword input from the user terminal unit 300.

Provision of Image Data

Next, a process of providing to a user both image data and link information between image data generated by the method described above will be described.

When a search word or phrase is input from the user terminal unit 300, the user interface module 210 retrieves a map screen image corresponding to the search word or phrase input from the user terminal unit 300, and the user interface module 210 then sends the retrieved map screen image to the user terminal unit 300. At this time, from the database 240b, the user interface module 210 may search for image data including, as region information, coordinates or a region included in the map screen image, which is being sent to the user terminal unit 300. Then, if the user interface module 210 can retrieve a result, the user interface module 210 may also provide information relating to the retrieved result to the user terminal unit 300.

Figure 4:
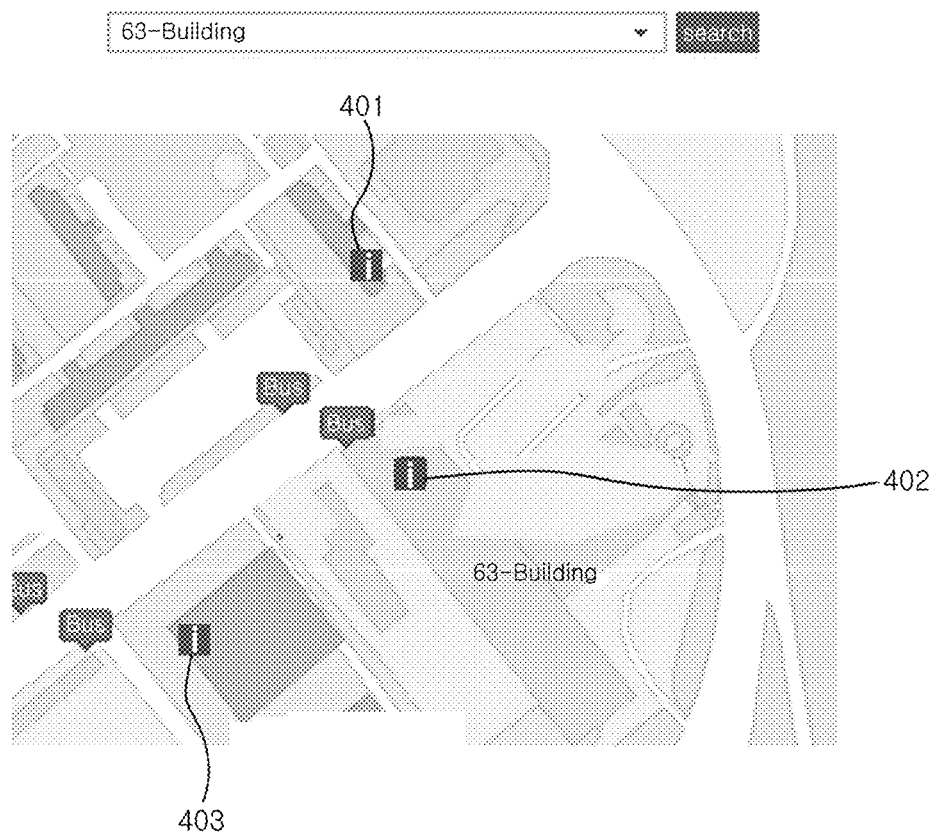
FIG. 4 is a view of one example of a map screen output on a user terminal unit.

FIG. 4 illustrates one example of a map screen image output on the user terminal unit 300.

Referring to FIG. 4, it can be confirmed that a map screen image corresponding to a search word "63 Building" input by a user is provided, and that icons 401, 402, and 403 are displayed on the map screen image. Here, the icons may represent that image data corresponding to regions associated therewith are present, and may also include a link function, which allows the user to retrieve the image data using the icons.

When a user clicks or otherwise selects any icon, the user interface module 210 may retrieve image data associated with the icon, that is, associated with a clicked region on the electronic map, from the image database 240b, and provide the acquired image data to the user terminal unit 300.

Furthermore, the image link supply part 230 may receive identification information of the image data acquired by the user interface module 210 and provide image link data, retrieved from the image link database 240c and related to the image data, to the user interface module 210, thereby enabling the link information between the image data to be is displayed.

Figure 5:
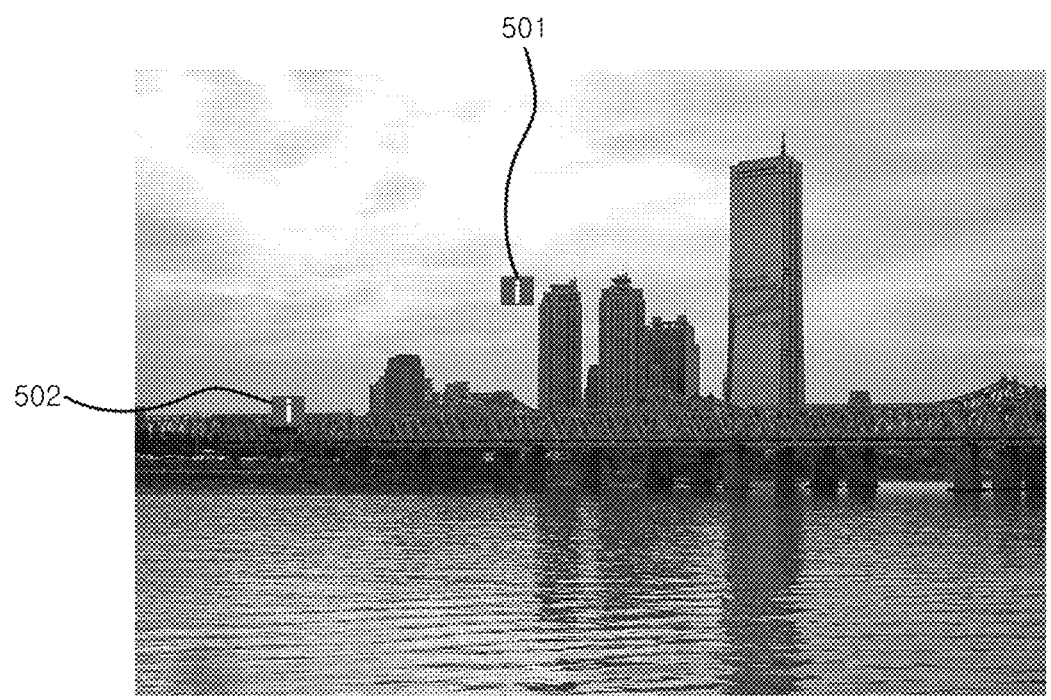
FIG. 5 is a view of image data displayed on the user terminal unit.

FIG. 5 is a view of image data displayed on the user terminal unit 300.

Referring to FIG. 5, it can be confirmed that icons 501 and 502 are displayed on image data searched by a user. Here, the icons may represent that other image data corresponding to regions associated therewith are present, and may also include a link function, which allows the user to retrieve the image data using the icons.

When a user clicks or otherwise selects a particular icon, other image data associated with the particular icon, that is, associated with a selected region on the image data, may be provided to the user terminal unit 300.

The exemplary embodiments described above may be realized in the form of program instructions, which can be implemented through various computer components, and may be recorded in a computer-readable recording medium. The computer-readable recording medium may include a program instruction, a data file, a data structure, and the like either alone or in combination thereof. The program instruction recorded in the computer-readable recording medium may be any program instruction particularly designed and structured for the present disclosure or known to those skilled in the field of computer software. Examples of the computer-readable recording medium include magnetic recording media such as hard disks, floppy disks and magnetic tapes, optical data storage media such as CD-ROMs or DVD-ROMs, magneto-optical media such as floptical disks, and hardware devices, such as read-only memory (ROM), random-access memory (RAM), and flash memory, which are particularly structured to store and implement the program instruction. Examples of the program instruction include not only a mechanical language code formatted by a compiler but also a high level language code, which can be implemented by a computer using an interpreter. The hardware devices may be is configured to be operated by one or more software modules or vice versa to perform the processes according to the present disclosure.

According to the exemplary embodiments, a user can confirm an actual shape of a place displayed on an electronic map through image data associated with the place.

According to the exemplary embodiments, since it is possible to easily access other image data using a link included in certain image data, a user can easily access geographical information about a target place.

According to the exemplary embodiments, link information between a plurality of image data can be automatically generated.

The various exemplary embodiments described above can be combined to provide further embodiments. All of patents, patent application publications, patent applications, and non-patent publications referred to in this specification and/or listed in the Application Data Sheet are incorporated herein by reference, in their entirety. Aspects of the exemplary embodiments can be modified, if necessary, to employ concepts of the various patents, applications and publications to provide yet further embodiments.

These and other changes can be made to the exemplary embodiments in light of the above-detailed description. In general, in the following claims, the terms used should not be construed to limit the claims to the specific exemplary embodiments disclosed in the specification and the claims, but should be construed to include all possible embodiments along with the full scope of equivalents to which such claims are entitled. Accordingly, the claims are not limited by the disclosure.

What is claimed is:

1. A method that uses a processor to provide image data associated with an electronic map, the method comprising:
    acquiring region information corresponding to first image data based on the electronic map;
    determining, by the processor, a candidate region on the electronic map based on the region information;
    acquiring at least one of shape identification information based on the candidate region;
    determining, by the processor, at least one of second image data based on the at least one of shape identification information; and
    automatically generating an association relation between the first image data and the at least one of second image data, wherein the association relation comprises generating link information to link the first image data with the second image data, wherein icons representing the link information are displayed together with the first image data, and wherein the second image data linked to the first image data is provided in response to selection of one of the icons on the first image data.

2. The method of claim 1,
    wherein the region information comprises coordinate information on the electronic map, and the candidate region comprises a region within a radius with reference to the coordinate information or a region within a polygon with reference to the coordinate information.

3. The method of claim 2, wherein the first image data is associated with information about a direction in which the first image data is captured.

4. The method of claim 2, wherein the candidate region comprises a region within an angle with reference to the direction in which the first image data is captured.

5. The method of claim 2, wherein the first image data comprises pixel columns, each of which is associated with direction information and wherein the candidate region on the electronic map is determined using the direction information of the pixel columns that comprise the shape of the first image data.

6. The method of claim 1, wherein the at least one of shape identification information comprises identification information of a geographical feature or an object included in the candidate region.

7. The method of claim 6, wherein the second image data is associated with a region on the electronic map where the geographical feature or object corresponding to the at least one of shape identification information is marked.

8. The method of claim 7, wherein determining at least one of second image data comprises:
    calculating a degree of similarity between at least one of shapes included in the first image data; and
    determining, as the second image data, at least one of image data whose degree of similarity is more than a predetermined value.

9. A system for providing image data associated with an electronic map, the system comprising:
    a non-transitory storage device;
    one or more units, executable by a processor, stored in the non-transitory device, comprising,
    a candidate shape filtering unit configured to acquire region information corresponding to first image data based on the electronic map, configured to determine a candidate region on the electronic map based on the region information, and configured to acquire at least one of shape identification information based on a candidate region;
    a shape recognition unit configured to determine at least one of second image data based on the at least one of shape identification information; and
    an image association part configured to automatically generate an association relation between the first image data and the second image data, wherein the association relation comprises generating link information to link the first image data with the second image data, wherein icons representing the link information are displayed together with the first image data, and wherein the second image data linked to the first image data is provided in response to selection of one of the icons on the first image data.

10. The system of claim 9, wherein the region information comprises coordinate information on the electronic map, and the candidate region comprises a region within a radius with reference to the coordinate information or a region within a polygon with reference to the coordinate information.

11. A non-transitory computer-readable medium comprising an executable program which, when executed by a processor, performs the method of:
    acquiring region information corresponding to first image data based on the electronic map;
    determining, by the processor, a candidate region on the electronic map based on the region information;
    acquiring at least one of shape identification information based on the candidate region;
    determining, by the processor, at least one of second image data based on the at least one of shape identification information; and
    automatically generating an association relation between the first image data and the at least one of second image data, wherein the association relation comprises generating link information to link the first image data with the second image data, wherein icons representing the link information are displayed together with the first image data, and wherein the second image data linked to the first image data is provided in response to selection of one of the icons on the first image data.

12. A method that uses a processor to capture image data associated with an electronic map, the method comprising:
    receiving a search request, the request comprising image data associated with a region of the electronic map;
    determining, by the processor, a candidate region corresponding to at least one candidate image data, the candidate region being defined and adjusted by using image data identification information comprising at least one of coordinate information, azimuth information and tag information, the coordinate information, the azimuth information and the tag information being provided for identifying the image data and being stored in a database; and
    recognizing a shape image corresponding to the candidate image data of the candidate region by calculating a degree of similarity of the shape image of the candidate image data and a sample shape image based on the image data identification information.

* * * * *